US012798950B2

(12) United States Patent
Jinno et al.

(10) Patent No.: US 12,798,950 B2
(45) Date of Patent: Nov. 17, 2026

(54) CAP OPENING AND CLOSING APPARATUS

(71) Applicants: Makoto Jinno, Tokyo (JP); Ryosuke Nonoyama, Tokyo (JP)

(72) Inventors: Makoto Jinno, Tokyo (JP); Ryosuke Nonoyama, Tokyo (JP)

(73) Assignees: Makoto Jinno, Tokyo (JP); Ryosuke Nonoyama, Tokyo (JP)

( * ) Notice: Subject to any disclaimer, the term of this patent is extended or adjusted under 35 U.S.C. 154(b) by 352 days.

(21) Appl. No.: 18/664,979

(22) Filed: May 15, 2024

(65) Prior Publication Data

US 2024/0391748 A1 Nov. 28, 2024

(30) Foreign Application Priority Data

May 26, 2023 (JP) ................................ 2023-087129

(51) Int. Cl.
*B67B 7/14* (2006.01)
*B01L 3/00* (2006.01)
*B01L 9/06* (2006.01)

(52) U.S. Cl.
CPC ............ *B67B 7/14* (2013.01); *B01L 3/50825* (2013.01); *B01L 9/06* (2013.01)

(58) Field of Classification Search
CPC ......... B67B 7/02; B67B 7/14; B01L 3/50825; B01L 9/06
See application file for complete search history.

(56) References Cited

U.S. PATENT DOCUMENTS 8,196,375 B2 * 6/2012 Kohanski .............. B67B 3/2006 53/317
8,703,056 B2 * 4/2014 Sakairi ................. G01N 35/025 422/65
9,052,299 B2 * 6/2015 Jones ..................... G01N 35/04
11,572,263 B2 2/2023 Lee
2007/0095024 A1 * 5/2007 Neeper ................. B65B 7/2821 53/381.4
2007/0110624 A1 5/2007 Lare et al.
2008/0022808 A1 * 1/2008 Owen .................. G01N 35/026 81/3.2
2014/0102239 A1 * 4/2014 Umeno .................. B25J 9/0087 294/213
2023/0373772 A1 * 11/2023 Jinno ........................ B67B 3/22

FOREIGN PATENT DOCUMENTS

JP 2019-527339 A 9/2019

* cited by examiner

*Primary Examiner* — Andrew M Tecco
*Assistant Examiner* — Nicholas E Igbokwe
(74) *Attorney, Agent, or Firm* — WHDA, LLP

(57) ABSTRACT

A cap opening and closing apparatus that opens and closes caps of a plurality of micro tubes, includes: a first rotary member that rotates around a first rotation axis; a plurality of first engaging portions which are mounted on the first rotary member, and which respectively uncap the plurality of micro tubes by temporarily engaging with the caps during rotation of the first rotary member; a second rotary member that rotates around a second rotation axis different from the first rotation axis; and a plurality of capping units that, during rotation of the second rotary member, respectively cap the plurality of micro tubes by converting a force of the rotation into a force that temporarily pushes upper surfaces of the caps.

16 Claims, 12 Drawing Sheets

CAP OPENING AND CLOSING APPARATUS

CROSS-REFERENCE TO RELATED APPLICATION(S)

This application claims priority to and the benefit of Japanese Patent Application No. 2023-087129 filed on May 26, 2023, the entire disclosure of which is incorporated herein by reference.

BACKGROUND OF THE INVENTION

Field of the Invention

The present invention relates to a cap opening and closing apparatus that opens and closes caps of micro tubes.

Description of the Related Art

In order to deal with a novel coronavirus (COVID-19), and further virus mutations and unknown viruses in the future, automation of a system that performs PCR testing and the like has become indispensable. In PCR testing and the like, in order to process a plurality of types of samples such as saliva and mucus collected by nasopharyngeal swabbing, a variety of containers such as centrifuge tubes, cryopreservation tubes, and micro tubes are used. Especially, micro tubes are often used in processing of samples; in automation and streamlining of a test system, automation of opening and closing of micro tubes is a crucial point. In particular, in order to achieve high-throughput test work, there has been a demand for a cap opening and closing apparatus that can open or close a plurality of micro tubes collectively.

Japanese Patent Laid-Open No. 2019-527339 (Patent Literature 1) discloses a mechanism including an opening and closing unit that opens or closes caps of a plurality of micro tubes collectively. An apparatus of Patent Literature 1 uses an opening and closing unit that has been structured to include one plate member extending along a plurality of aligned micro tubes, and an edge portion of the plate member along the plurality of aligned micro tubes has been bent to have an angular U shape. The opening and closing unit and the caps of the plurality of micro tubes are placed in engagement with each other by sliding the tips of the caps into a space formed in the angular U shape of the opening and closing unit, and the caps of the plurality of micro tubes are opened or closed at a time by rotating the opening and closing unit in this state.

In the case of micro tubes, containers with the same capacity have substantially the same external dimensions (diameter and length), but the shapes and dimensions of caps have subtle differences on a per-manufacturer basis for the purpose of differentiation from other companies in terms of usability, sealing properties, and so forth. If uniform micro tubes can be used, automation of opening and closing of caps is easy. However, when only micro tubes of a specific manufacturer are used, if it becomes difficult to obtain micro tubes from that manufacturer, a critical situation arises where testing cannot be carried out. Furthermore, it is also not easy to have discrete companies provide the same micro tubes by completely standardizing the shapes of micro tubes. Therefore, it is crucial to structure a cap opening and closing mechanism that can handle micro tubes of a variety of manufacturers.

According to Patent Literature 1, although the caps of the plurality of micro tubes can be opened or closed simultaneously, means to deal with changes in the cap shapes of the micro tubes has not been taken into consideration. For example, Patent Literature 1 adopts a configuration in which, due to the angular U shape of the opening and closing unit, the opening and closing unit is hooked to the caps from above the caps to uncap the microtubes; therefore, the tips of the caps that can be opened and closed are restricted in thickness and shape. Furthermore, according to Patent Literature 1, as the opening and closing unit opens or closes the plurality of micro tubes simultaneously, the load for driving the opening and closing unit when uncapping or capping the plurality of micro tubes becomes large.

The present invention provides a mechanism that adapts to diverse cap shapes of micro tubes, and also opens and closes caps of a plurality of micro tubes with a relatively small load.

SUMMARY OF THE INVENTION

According to one aspect of the present invention, there is provided a cap opening and closing apparatus that opens and closes caps of a plurality of micro tubes, comprising: a first rotary member that rotates around a first rotation axis; a plurality of first engaging portions which are mounted on the first rotary member, and which respectively uncap the plurality of micro tubes by temporarily engaging with the caps during rotation of the first rotary member; a second rotary member that rotates around a second rotation axis different from the first rotation axis; and a plurality of capping units that, during rotation of the second rotary member, respectively cap the plurality of micro tubes by converting a force of the rotation into a force that temporarily pushes upper surfaces of the caps, wherein the plurality of first engaging portions uncap the plurality of micro tubes until single rotation of the first rotary member is completed by respectively engaging with the caps at different rotation positions of the first rotary member, and the plurality of capping units cap the plurality of micro tubes until single rotation of the second rotary member is completed by respectively pressing the upper surfaces of the caps at different rotation positions of the second rotary member. The present invention makes it possible to open and close caps more reliably for diverse cap shapes of micro tubes, and also open and close caps of a plurality of micro tubes at a time.

DESCRIPTION OF THE EMBODIMENTS

Figure 1A:
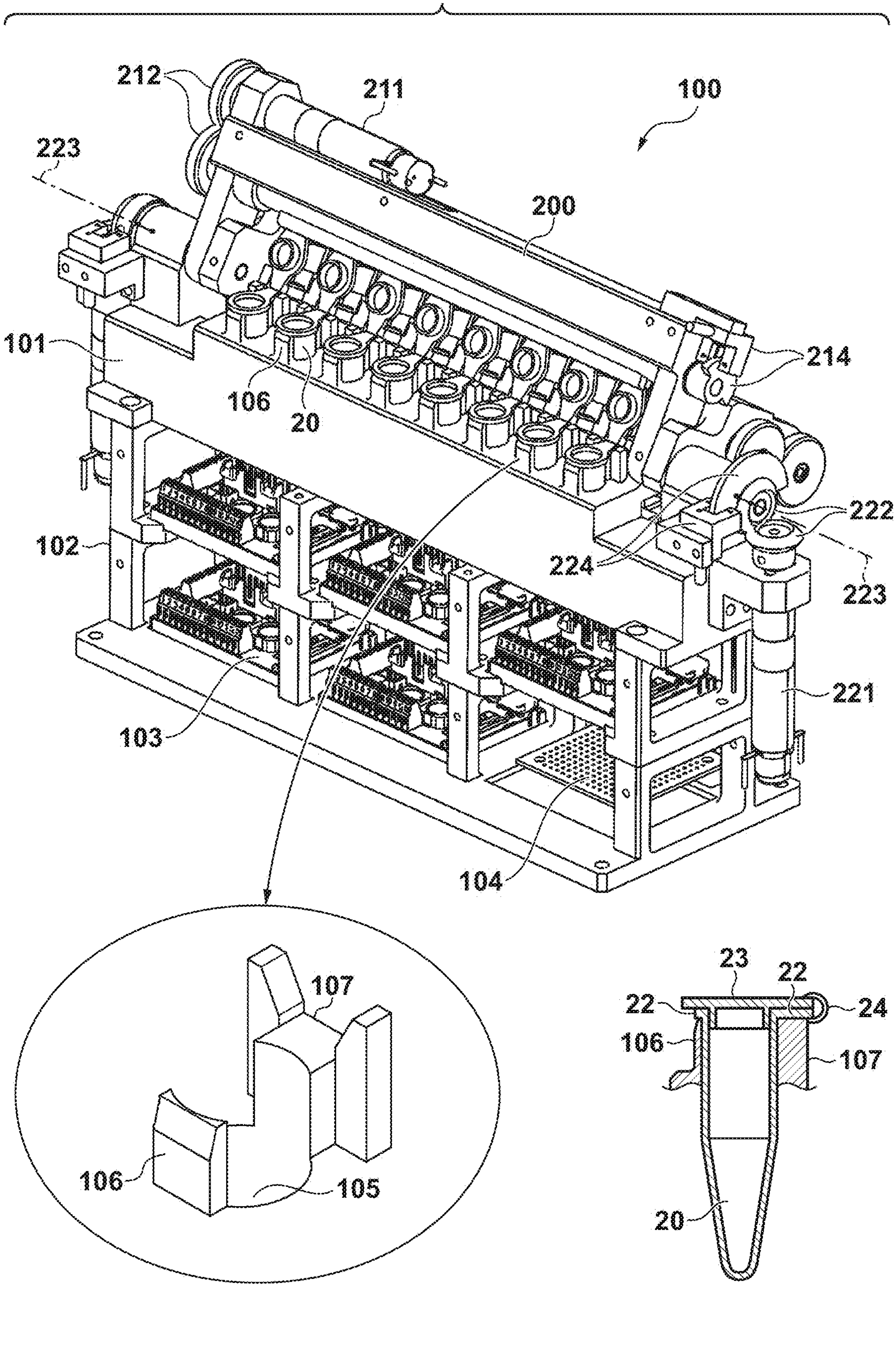
FIG. 1A is a diagram showing an external view of a cap opening and closing apparatus (front side) according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Figure 1B:
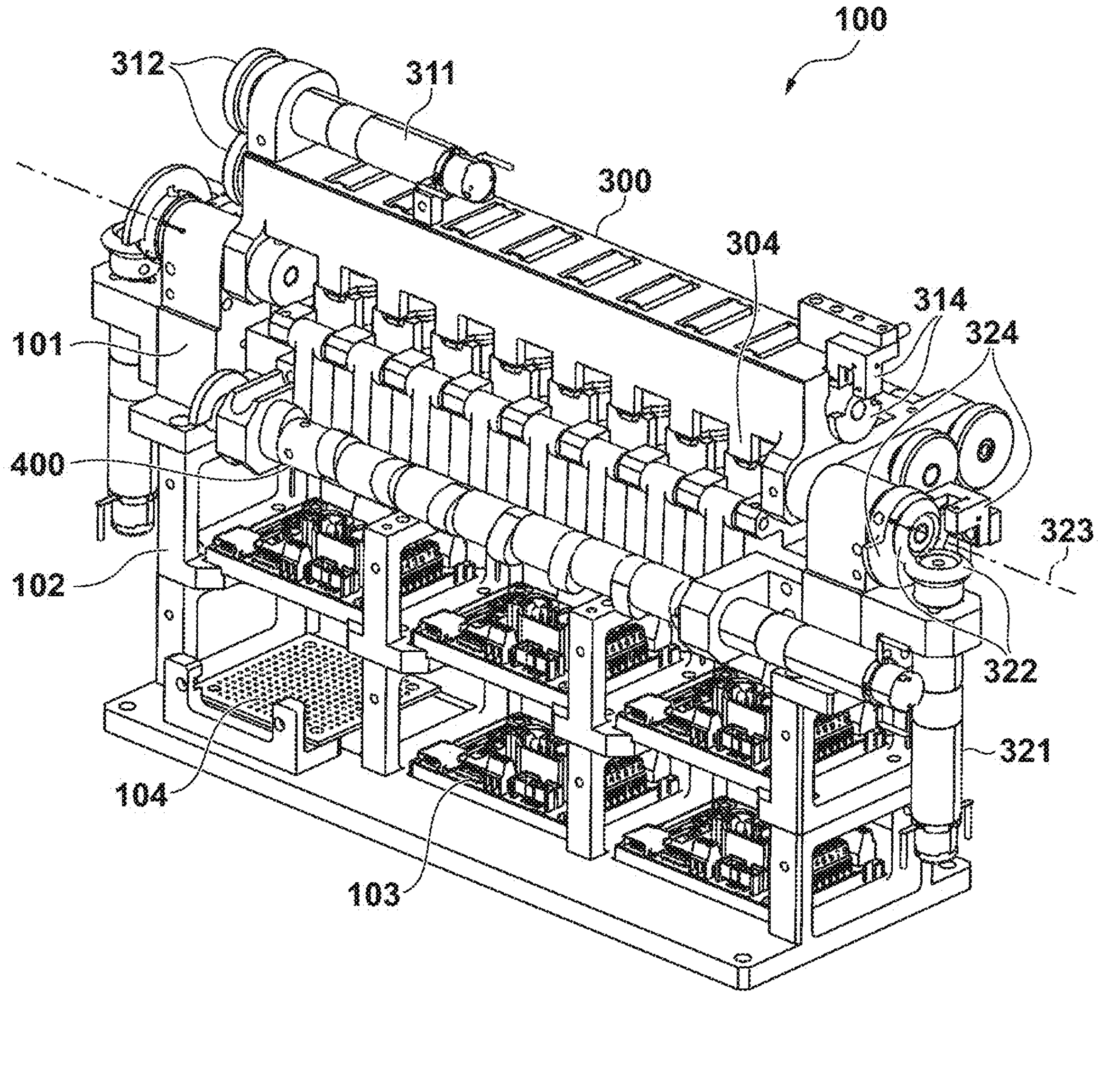
FIG. 1B is a diagram showing an external view of the cap opening and closing apparatus (rear side) according to the embodiment.

FIG. 1A and FIG. 1B are diagrams showing an external view of a cap opening and closing apparatus 100 according to an embodiment. FIG. 1A is a diagram of the cap opening and closing apparatus 100 as viewed from the front side after an uncapping operation has been finished, and FIG. 1B is a diagram of the cap opening and closing apparatus 100 as viewed from the rear side after a capping operation has been finished or when the uncapping operation is started. The present embodiment provides a description of a mechanism that opens or closes caps of eight micro tubes 20 in a single uncapping operation or capping operation; however, the number of micro tubes whose caps are opened or closed in a single uncapping operation or capping operation is not limited to this, and it is sufficient that the number be two or more. An uncapping mechanism unit 200, a capping mechanism unit 300, and a holding mechanism unit 400 are attached to a base unit 101. The details of the uncapping mechanism unit 200, the capping mechanism unit 300, and the holding mechanism unit 400 will be described later with reference to FIGS. 2A-2C to 4A-4D. The base unit 101 includes insertion holes 105 for housing a plurality of micro tubes 20 (in the present example, eight micro tubes 20 as stated earlier) in an insertable and removable manner; FIG. 1A shows a state where the micro tubes have been inserted in all of the insertion holes 105. Motor controllers 103 for controlling driving of each motor, which will be described later, and an interface 104 for communicating with external apparatuses such as a personal computer are housed in a rack unit 102 located below the base unit 101.

When having been inserted in the eight insertion holes 105, the eight micro tubes 20 are situated at predetermined positions where the uncapping operation and the capping operation can be performed by the uncapping mechanism unit 200, the capping mechanism unit 300, and the holding mechanism unit 400. When a micro tube 20 has been inserted in an insertion hole 105, a front support 106 and a rear support 107 support an upper edge (a rim portion 22) of a container body 21. The front support 106 and the rear support 107 support the rim portion 22 respectively at a position near a protruding portion of a cap 23 of the micro tube 20 (a site on the opposite side of a hinge portion 24 that connects the container body and the cap 23), and a position near the hinge portion 24 of the micro tube 20. As a result of supporting the rim portion 22 of the micro tube 20 with the front support 106 and the rear support 107, a space that allows an engaging portion (a later-described projection 231) of the uncapping mechanism unit 200 to be situated below the protruding portion of the cap is secured. Hereinafter, the cap 23 is simply referred to as a cap. Note that an upper part of the front support 106 has been tapered to avoid interference with the engaging portion. Furthermore, the rear support 107 includes a pair of guiding portions that have been tapered so that the distance therebetween decreases toward a supporting surface. According to such a structure of the rear support 107, the hinge portion of the micro tube 20 inserted in the insertion hole 105 is placed between the guiding portions, thereby stabilizing the orientation of the micro tube 20.

Figure 2A:
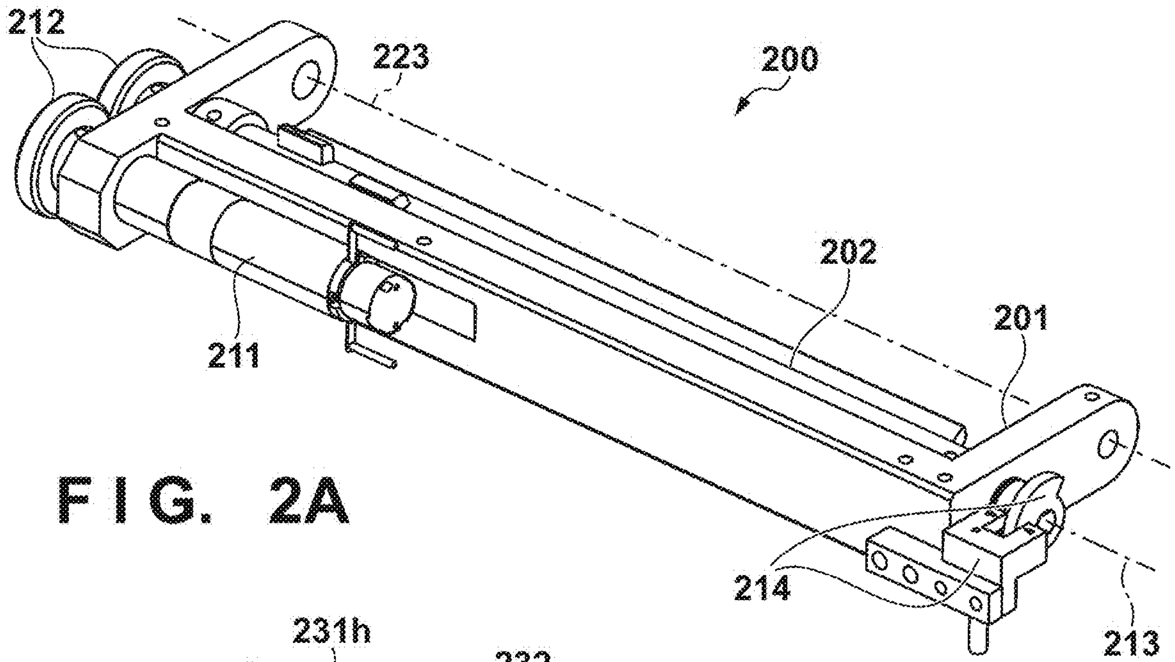
FIGS. 2A to 2C are diagrams showing the details of an uncapping mechanism unit of the cap opening and closing apparatus according to the embodiment.
Figure 2B:
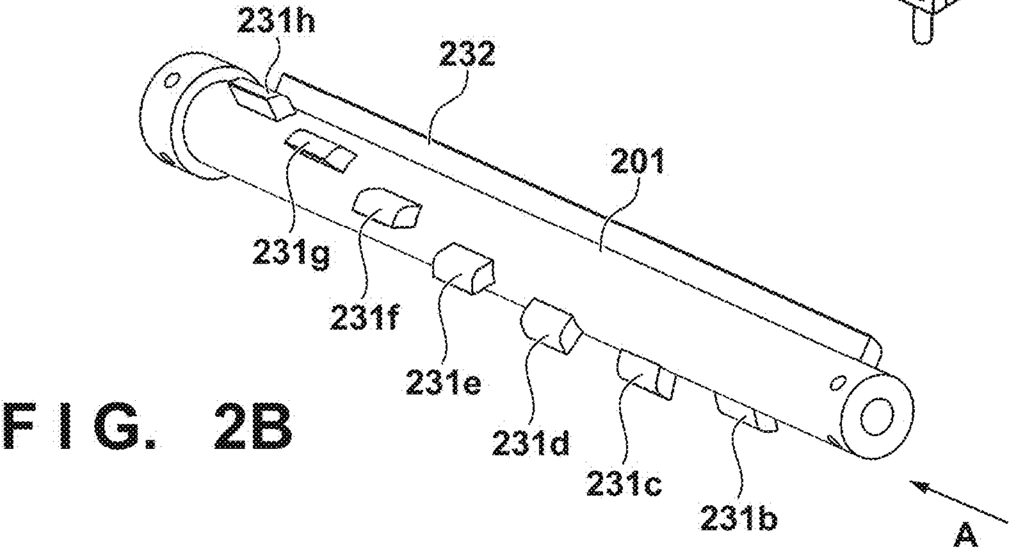
Figure 2C:
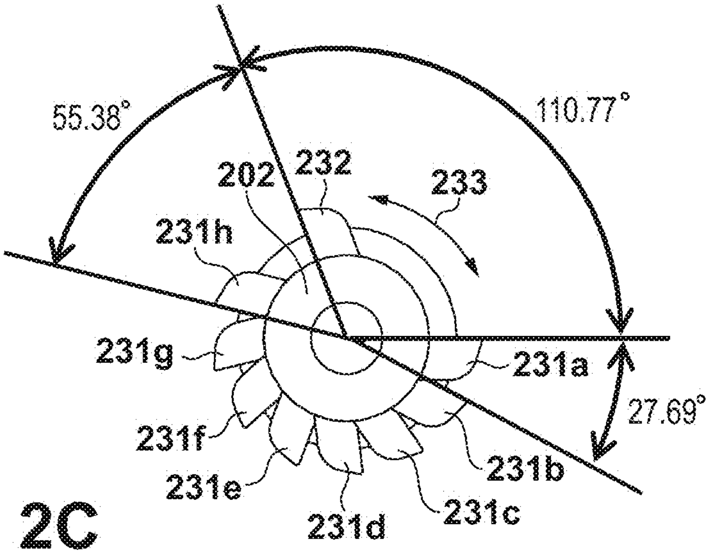

FIGS. 2A to 2C show a detailed configuration of the uncapping mechanism unit 200. FIG. 2A indicates an external view of the uncapping mechanism unit 200. The uncapping mechanism unit 200 includes an uncapping arm 201 and an uncapping roller 202 attached to the uncapping arm 201. The uncapping roller 202 is an example of a rotary member that is rotated by a first uncapping motor 211 and a gear unit 212 around a first rotation axis 213. The first rotation axis 213 is parallel to the direction of alignment of the plurality of insertion holes 105 in which the eight micro tubes 20 are inserted. A rotation position detection unit 214 is composed of, for example, a photosensor and a light-shielding plate, and detects a rotation position (e.g., the position of the origin) of the uncapping roller 202. The first uncapping motor 211 is composed of, for example, a servomotor (a geared motor with an incremental encoder); for example, rotation thereof is controlled by way of angle and speed detection performed by the incremental encoder after an operation to return to the origin is performed based on a detection signal of the rotation position detection unit 214. For example, the rotation position detection unit 214 is used in the first return to the origin (origin search) to determine the position of the origin of rotation of the uncapping roller 202. Thereafter, rotation of the first uncapping motor 211 is controlled based on a signal of the incremental encoder. Note that, in practice, the detection angle of the photosensor contains an assembly error and the like, and thus an arrangement to correct the detection position of the photosensor and regard the corrected position as the position of the origin is made on a per-apparatus basis. Rotation of the uncapping roller 202 is controlled in the above-described manner.

The uncapping arm 201 is attached to the base unit 101, and is rotated by a second uncapping motor 221 and a gear unit 222 (FIG. 1A) around a second rotation axis 223. The second rotation axis 223 is parallel to the first rotation axis 213. A rotation position detection unit 224 is composed of, for example, a photosensor and a light-shielding plate, and detects a rotation position (e.g., the position of the origin) of the uncapping arm 201. The second uncapping motor 221 is composed of, for example, a servomotor (a geared motor with an incremental encoder); for example, rotation thereof is controlled similarly to the first uncapping motor 211 based on a detection signal of the rotation position detection unit 224 and a signal of the incremental encoder. In this way, rotation of the uncapping arm 201 is controlled.

FIGS. 2B and 2C are diagrams showing the uncapping roller 202 that has been taken out. FIG. 2B is a perspective diagram showing an external view of the uncapping roller 202, and FIG. 2C is a diagram of the uncapping roller 202 as viewed from the direction A in FIG. 2B. The uncapping roller 202 is a rotary member having a columnar shape (or a hollow cylindrical shape). Eight projections 231 (*a-h*) are mounted on a side surface of the uncapping roller 202 in a spiral fashion along the direction of the first rotation axis 213, so as to correspond to the eight micro tubes 20 housed in the base unit 101. As will be described later using FIG. 5, the projections 231 (*a-h*) function as a plurality of engaging portions that, while the uncapping roller 202 is rotating, engage with the caps of the plurality of micro tubes 20 at different rotation positions of the uncapping roller 202. Until single rotation of the uncapping roller 202 around the first rotation axis 213 is completed, the projections 231 (*a-h*) temporarily engage with and open the caps of the eight micro tubes 20 in a sequential order. Also, on the side surface of the uncapping roller 202, a projection 232 is further provided which engages with the caps of the eight micro tubes 20 at a time, and which extends over almost the entire length of the side surface in the direction of the first rotation axis 213. It goes without saying that the projection may be divided into eight pieces as long as they can engage with the caps of the eight micro tubes 20 at a time.

Note that as indicated by FIG. 2C, there is an area 233 that engages with none of the projections 231 and the projection 232. The area 233 makes it possible to prevent the projections 231 and the projection 232 of the uncapping roller 202 from interfering with the protruding portions of the caps 23 of the micro tubes 20 when the micro tubes are inserted into the insertion holes 105, when the micro tubes are removed from the insertion holes 105, when the micro tubes are capped, and the like. The area 233 is used as, for example, the position of the origin of rotation and the initial position of the uncapping roller 202, which will be described later. Also, although a roller having a columnar shape is used as the uncapping roller 202 in the present example, no limitation is intended by this. It is permissible to adopt a configuration in which disk-shaped members that include the projections 231 and the projection 232 have been joined along the direction of the rotation axis.

Note that the intervals between and the arrangements of the projections in the present embodiment are set as follows. The interval between the projections 231 (*a-h*) is set at an equal interval of 360 degrees/13=27.69 degrees; in this way, the micro tubes can easily be uncapped in a sequential order by rotating the uncapping roller 202 at a constant rotation speed. In a case where the micro tubes are uncapped in a sequential order, simultaneous uncapping of multiple micro tubes can be avoided, thereby enabling a reduction in the motor torque and a reduction in the weights of structural members. Furthermore, the interval between the projections 231*h* and 232 is set at 360 degrees/13×2=55.38 degrees, and the interval between the projections 232 and 231*a* is set at 360 degrees/13×4=110.77 degrees. There is no problem in setting the interval between the projections 231*h* and 232 to be the same as the interval between the projections 231 (*a-h*). The interval between the projections 232 and 231*a* is set to be the largest, thereby ensuring a space that allows for passage without interference with the aforementioned protruding portions of the caps 23 of the micro tubes 20.

Figure 3A:
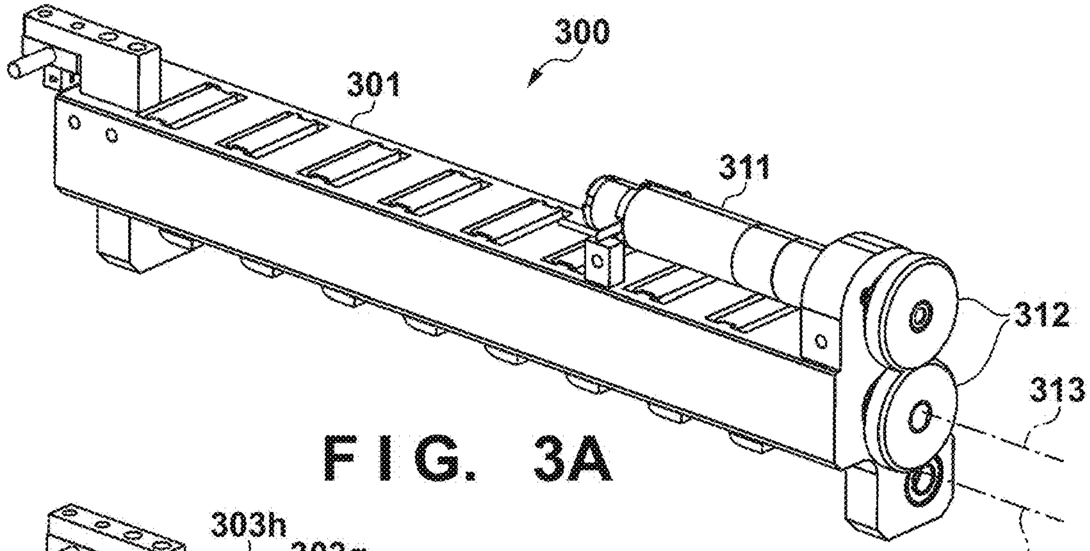
FIGS. 3A to 3D are diagrams showing the details of a capping mechanism unit of the cap opening and closing apparatus according to the embodiment.
Figure 3B:
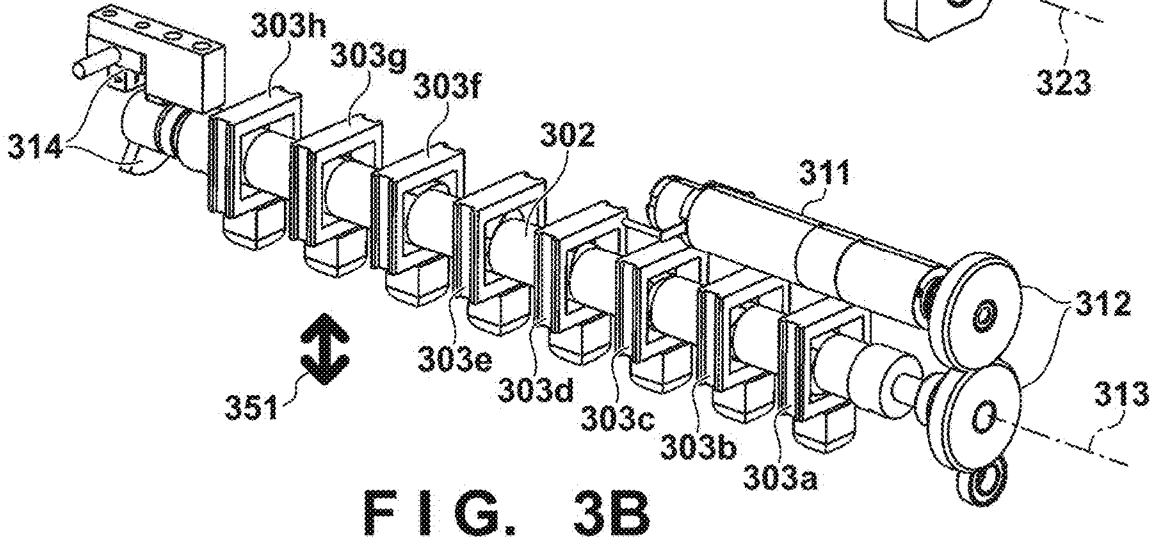

FIGS. 3A to 3D show the capping mechanism unit 300. FIG. 3A is a diagram showing an external view of the capping mechanism unit 300, and FIG. 3B is a diagram showing a capping roller 302 and capping cam followers 303 that are incorporated in the capping mechanism unit 300. The capping mechanism unit 300 includes a capping arm 301 and the capping roller 302 attached to the capping arm 301. The capping roller 302 is a rotary member that is rotated by a first capping motor 311 and a gear unit 312 around a third rotation axis 313. The third rotation axis 313 is parallel to the direction of alignment of the plurality of insertion holes 105 in which the eight micro tubes 20 are inserted. A rotation position detection unit 314 is composed of, for example, a photosensor and a light-shielding plate, and detects a rotation position (e.g., the position of the origin) of the capping roller 302. The first capping motor 311 is composed of, for example, a servomotor (a geared motor with an incremental encoder); for example, rotation thereof is controlled based on a detection signal of the rotation position detection unit 314 and a signal of the incremental encoder. A specific example of the control on rotation is as described above in connection with the first uncapping motor 211. In this way, rotation of the capping roller 302 is controlled.

The capping arm 301 is attached to the base unit 101, and is rotated by a second capping motor 321 and a gear unit 322 (FIG. 1B) around a fourth rotation axis 323. The fourth rotation axis 323 is parallel to the third rotation axis 313. A rotation position detection unit 324 is composed of, for example, a photosensor and a light-shielding plate, and detects a rotation position (e.g., the position of the origin) of the capping arm 301. The second capping motor 321 is, for example, a servomotor (a geared motor with an incremental encoder); for example, rotation thereof is controlled based on a detection signal of the rotation position detection unit 324 and a signal of the incremental encoder. A specific example of the control on rotation is as described above in connection with the first uncapping motor 211. In this way, rotation of the capping arm 301 is controlled.

Figure 9:
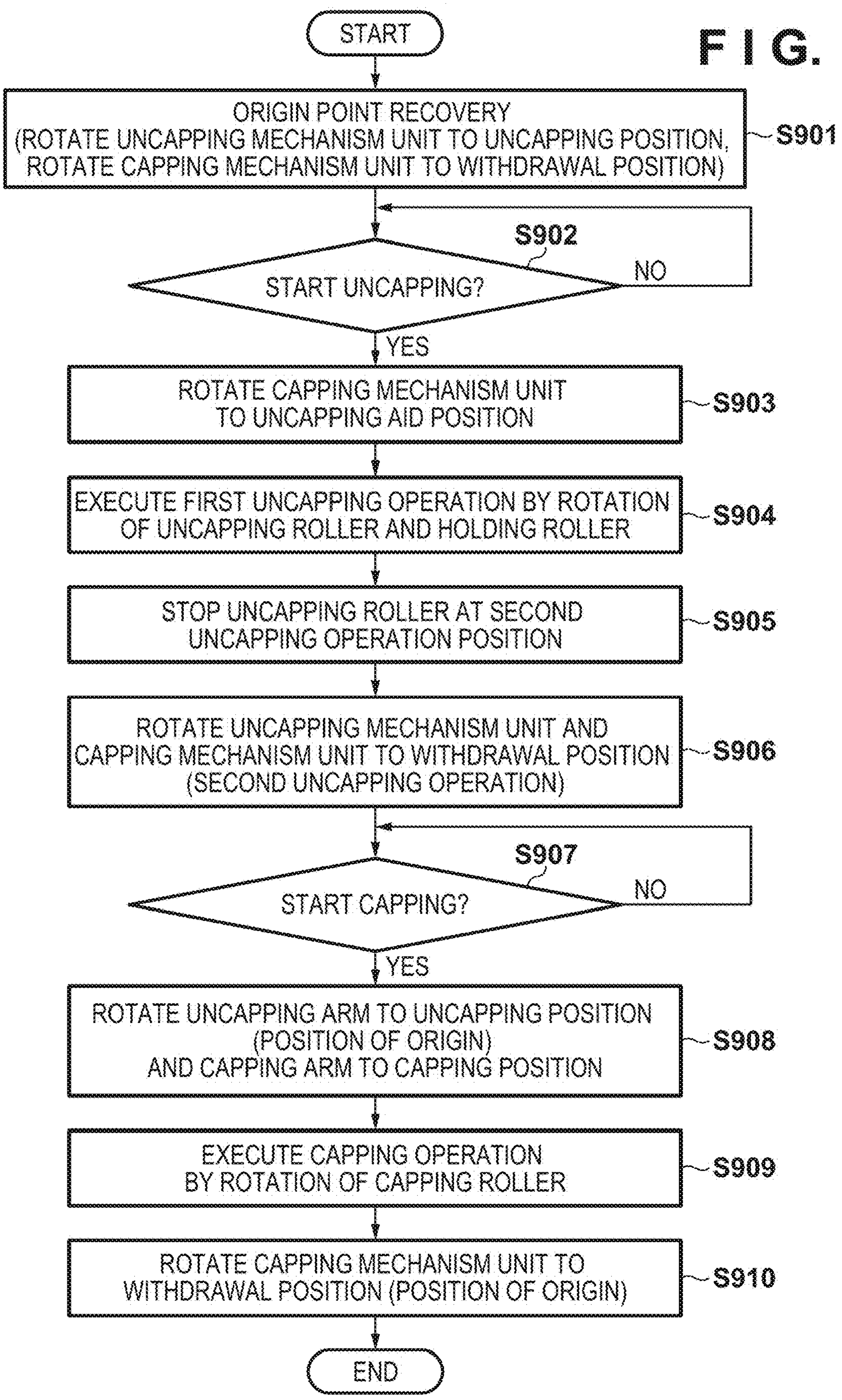
FIG. 9 is a flowchart showing control for the uncapping operation and the capping operation.

Eight capping cam followers 303 (*a-h*) are mounted on the capping arm 301 so as to correspond to the eight micro tubes situated in the base unit 101. Side surfaces of the capping cam followers 303 have recesses, and the capping arm 301 has projections. In this way, the capping cam followers 303 are attached to the capping arm 301 in such a manner that they can slide in the directions of an arrow 351, and capping cams 331 apply a force to the capping cam followers 303 in accordance with rotation of the capping roller 302. The application of the force by the capping cams 331 to the capping cam followers 303 will also be described later using FIG. 5. Furthermore, protruding portions 304 are provided on a rear surface of the capping arm 301 in correspondence with the positions at which the capping cam followers 303 are mounted. The protruding portions 304 have a function of preventing the micro tubes 20 from rising in a later-described second uncapping operation (step S906 of FIG. 9).

Figure 3C:
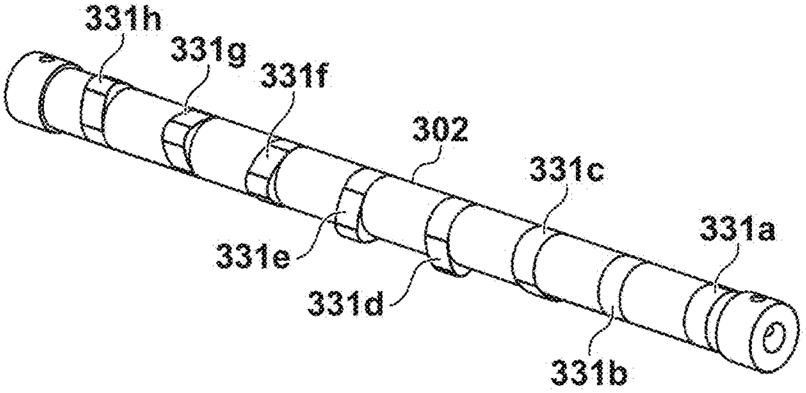
Figure 3D:
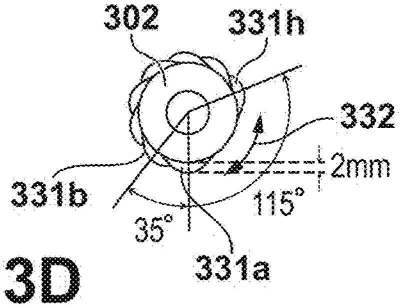

FIGS. 3C and 3D are diagrams showing the capping roller 302 that has been taken out. FIG. 3C is a perspective diagram showing an external view of the capping roller 302, and FIG. 3D is a diagram of the capping roller 302 as viewed from the direction of the rotation axis. The capping roller 302 is a rotary member having a columnar shape (or a hollow cylindrical shape). Eight capping cams 331 (*a-h*) are mounted on a side surface of the capping roller 302 in a spiral fashion along the direction of the third rotation axis 313, so as to correspond to the eight capping cam followers 303. During single rotation of the capping roller 302 around the third rotation axis 313, the capping cams 331 (*a-h*) apply a force respectively to the corresponding capping cam followers 303 (*a-h*) at different rotation positions. In this way, end portions 341 of the eight capping cam followers 303 (*a-h*) function as pressing members that press the caps of the micro tubes 20 in the vicinity of the central portions of the upper surfaces of the caps in a sequential order, thereby capping the micro tubes 20. The above-described mechanism that includes the capping cam followers 303 and the capping cams 331 is a conversion mechanism that caps the micro tubes 20 by converting a rotative force of the capping roller 302 into a force that pushes the caps of the micro tubes 20, and is an example of a plurality of capping units.

Note that as indicated in FIG. 3D, the capping roller 302 has an area 332 in which none of the capping cams 331 applies a force to the capping cam followers 303, and this area is used as the position of the origin of rotation and the initial position of the capping roller 302, which will be described later. Furthermore, although the present example has presented an example in which a column-shaped rotary member with the capping cams 331 along the direction of the rotation axis joined thereto is configured as the capping roller 302, no limitation is intended by this. For example, it is permissible to adopt a configuration in which projections that have shapes corresponding to the capping cams 331 are mounted on a columnar member like the uncapping roller 202.

Note that the intervals between and the arrangements of the capping cams 331 (*a-h*) in the present embodiment are set as follows. The interval between the capping cams 331 (*a-h*) is set at an equal interval of 35 degrees. In this way, the micro tubes can easily be capped in a sequential order at a constant rotation speed of the capping roller 302. In a case where the micro tubes are capped in a sequential order, simultaneous capping of multiple micro tubes can be avoided, thereby enabling a reduction in the motor torque and a reduction in the weights of structural members. Furthermore, the interval between the capping cams 331*h* and 331*a* is set at 115 degrees. This makes it possible to achieve a state where none of the capping cam followers 303 (*a-h*) applies a force or all of the capping cam followers 303 (*a-h*) apply a force. In a case where all of the capping cam followers 303 (*a-h*) apply a force, it is sufficient to rotate the capping arm 301 in the direction of the application of the force. Furthermore, a stroke of the cam followers is set at 2 mm as a stroke required to cap the micro tubes.

Figure 4A:
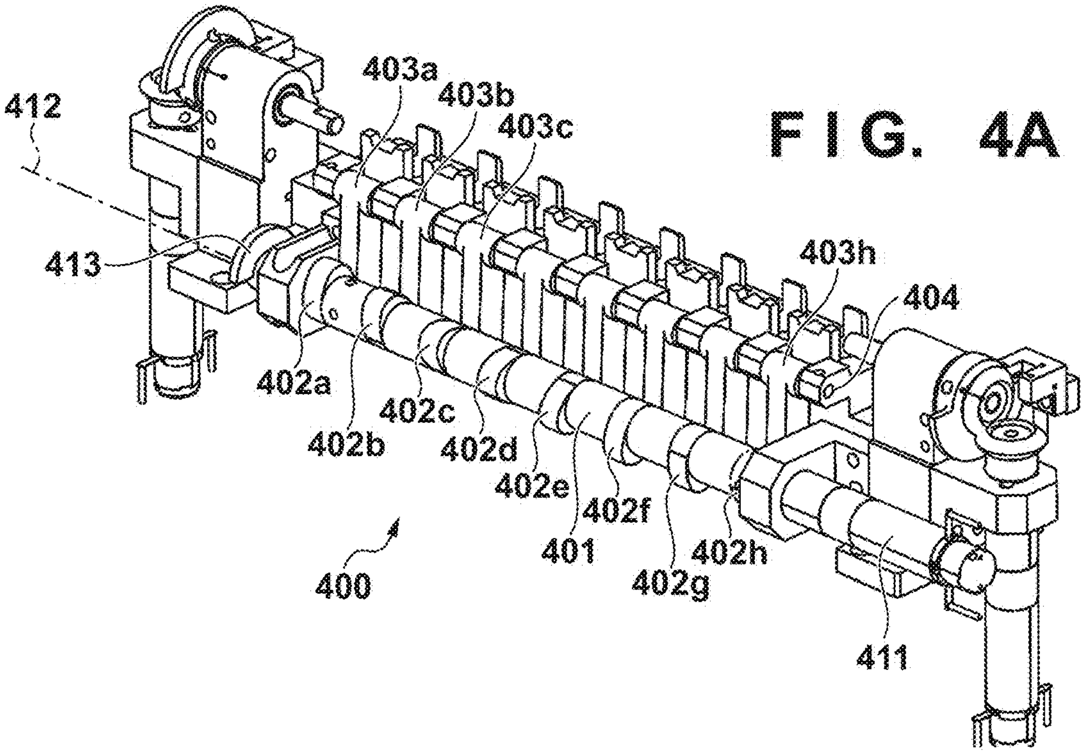
FIGS. 4A to 4D are diagrams showing the details of a holding mechanism unit of the cap opening and closing apparatus according to the embodiment.
Figure 4B:
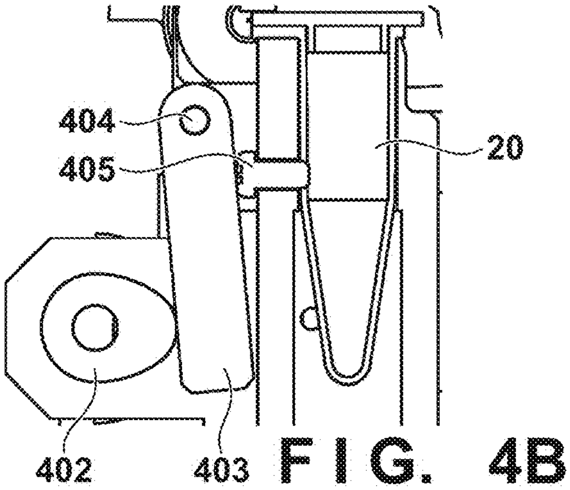
Figure 4C:
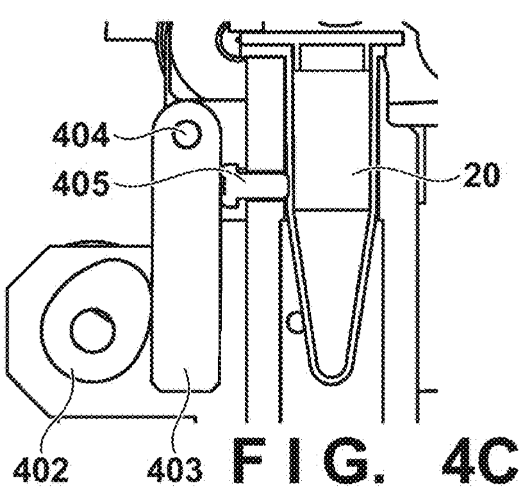
Figure 4D:
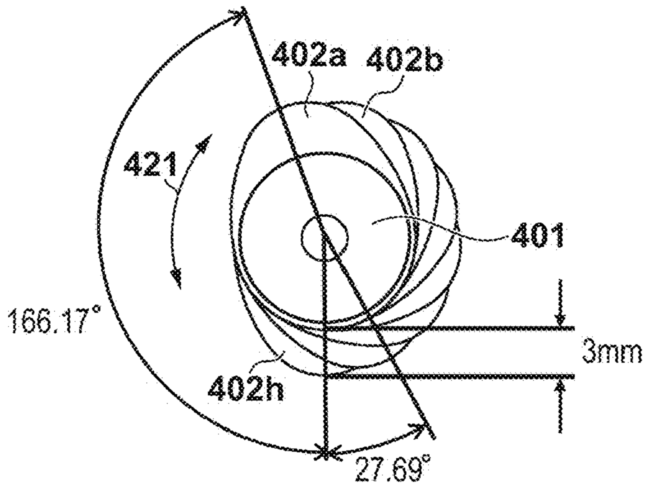

FIGS. 4A to 4D show a detailed configuration of the holding mechanism unit 400. The holding mechanism unit 400 is a mechanism for holding the micro tubes 20 so as to prevent them from moving upward when they are uncapped. As indicated in FIG. 4A, the holding mechanism unit 400 includes a holding roller 401 on which a plurality of holding cams 402 (*a-h*) are mounted, and a plurality of holding cam followers 403 (*a-h*). A force is applied to the holding cam followers 403 in accordance with rotation of the corresponding holding cams 402, and the holding cam followers 403 perform a rotating operation around a pivot shaft 404. The holding roller 401 is a rotary member that is rotated by a holding motor 411 around a fifth rotation axis 412. As indicated in FIG. 4D, the plurality of holding cams 402 (*a-h*) are mounted on the holding roller 401 in a state where they are displaced from one another at a rate of a predetermined rotation angle. Consequently, during single rotation of the holding roller 401, the holding cams 402 (*a-h*) apply a force to the plurality of holding cam followers 403 (*a-h*) in a sequential order. A rotation position detection unit 413 is composed of, for example, a photosensor and a light-shielding plate, and detects a rotation position (e.g., the position of the origin) of the holding roller 401. The holding motor 411 is, for example, a servomotor (a geared motor with an incremental encoder); for example, it is controlled based on a detection signal of the rotation position detection unit 413 and a signal of the incremental encoder. A specific example of the control on rotation is as described above in connection with the first uncapping motor 211. In this way, rotation of the holding roller 401 is controlled.

Note that as indicated in FIG. 4D, the holding roller 401 has an area 421 in which none of the holding cams 402 applies a force to the holding cam followers 403, and this area is used as the position of the origin of rotation and the initial position of the holding roller 401, which will be described later. Furthermore, although the present example has presented an example in which a column-shaped rotary member with the holding cams 402 along the direction of the rotation axis joined thereto is configured as the holding roller 401, no limitation is intended by this. For example, it is permissible to adopt a configuration in which projections that have shapes corresponding to the holding cams 402 are mounted on a columnar member like the uncapping roller 202.

FIGS. 4B and 4C are diagrams illustrating an operation performed by the holding cams 402 and the holding cam followers 403 to fasten the micro tubes. As indicated in FIGS. 4B and 4C, a holding pin 405 is provided at a position where a micro tube 20 is situated so as to be movable toward a side surface of the micro tube 20, and functions as a holding member that holds and fastens the micro tube 20. When the rotation of a holding cam 402 has applied a force to a holding cam follower 403 in the rightward direction of the figure, the holding cam follower 403 rotates around the pivot shaft 404 and pushes out the holding pin 405 toward the side surface of the micro tube 20. FIG. 4B indicates a state where the holding cam 402 has applied a force to the holding cam follower 403 and the holding pin 405 is pressing the side surface of the micro tube 20. As shown in the figure, a force that the holding cam 402 exerts on the holding cam follower 403 (the point of effort) is increased by taking advantage of the law of the lever and used as a force to push against the holding pin 405 (the point of load); in this way, the micro tube 20 can be held reliably with a small load. In this state, the micro tube 20 is fastened between the holding pin 405 and a wall surface of an insertion hole 105. In this way, by fastening the micro tubes 20 with the holding mechanism unit 400 when opening the caps with the uncapping mechanism unit 200 (projections 231), the micro tubes are prevented from moving when they are uncapped. In FIG. 4C, the holding cam follower 403 has been released from the state where a force is applied thereto by the holding cam 402, and pressing of the micro tube 20 by the holding pin 405 has been cleared. In this state, the micro tube 20 can be loaded in or unloaded from the base unit 101 (insertion hole 105). The above-described mechanism that includes the holding cams 402 and the holding cam followers 403 is a conversion mechanism that converts a rotative force of the holding roller 401 into a force that pushes the side surfaces of the micro tubes 20.

Note that the intervals between and the arrangements of the holding cams 402 (*a-h*) in the present embodiment are set as follows. The interval between the holding cams 402 (*a-h*) is set at an equal interval of 27.69 degrees, similarly to the interval between the projections 231. In this way, the micro tubes can easily be held in a sequential order at a constant rotation speed of the holding roller 401. In a case where the micro tubes are held in a sequential order, simultaneous holding of multiple micro tubes can be avoided, thereby enabling a reduction in the motor torque and a reduction in the weights of structural members. Furthermore, the interval between the holding cams 402*h* and 402*a* is set at 166.17 degrees. In this way, a state where none of the holding cam followers 403 (*a-h*) applies a force can be maintained, thereby allowing the micro tubes to be loaded or unloaded. A linkage structure has been adopted in which a 3-mm stroke of the holding cam followers 403 is decelerated to approximately ⅓ (the force is increased by a factor of 3) in order to ensure approximately 1 mm as a stroke of the holding pins 405 necessary for the holding.

Note that in the above-described example, the interval between the capping cams 331 (35 degrees) is larger than the interval between the projections 231 mounted on the uncapping roller 202 and between the holding cams 402 (27.69 degrees). This is because a strong pushing force is required when capping the micro tubes, and the following matters have been taken into consideration: the inclination of the cams is desired to be as gentle as possible; it is desirable that, when the micro tubes are capped, the caps be pushed in at the end one by one; and the area 332 is provided. Meanwhile, 27.69 degrees is selected in the present example because the projection 232 is mounted on the uncapping roller 202 in addition to the eight projections 231 (*a-h*), and the area 233 of a sufficient size is desired to be provided. Meanwhile, although the holding cams 402 require a sufficient stroke (=3 mm) to push the holding pins 405 via the holding cam followers 403, multiple holding cam followers 403 may be pushed to some extent. Also, in the later-described uncapping operation, it is desirable to facilitate synchronization between the timing of uncapping with the projections 231 and the timing of holding of the micro tubes with the holding cams 402 (it is sufficient to set the same rotation speed for the uncapping roller 202 and the holding roller 401). For the reasons described above, the interval between the holding cams 402 is set at the angle that is the same as the interval between the projections 231. Note that each of the numerical values described above is merely an example, and it goes without saying that no limitation is intended by this.

Figure 5:
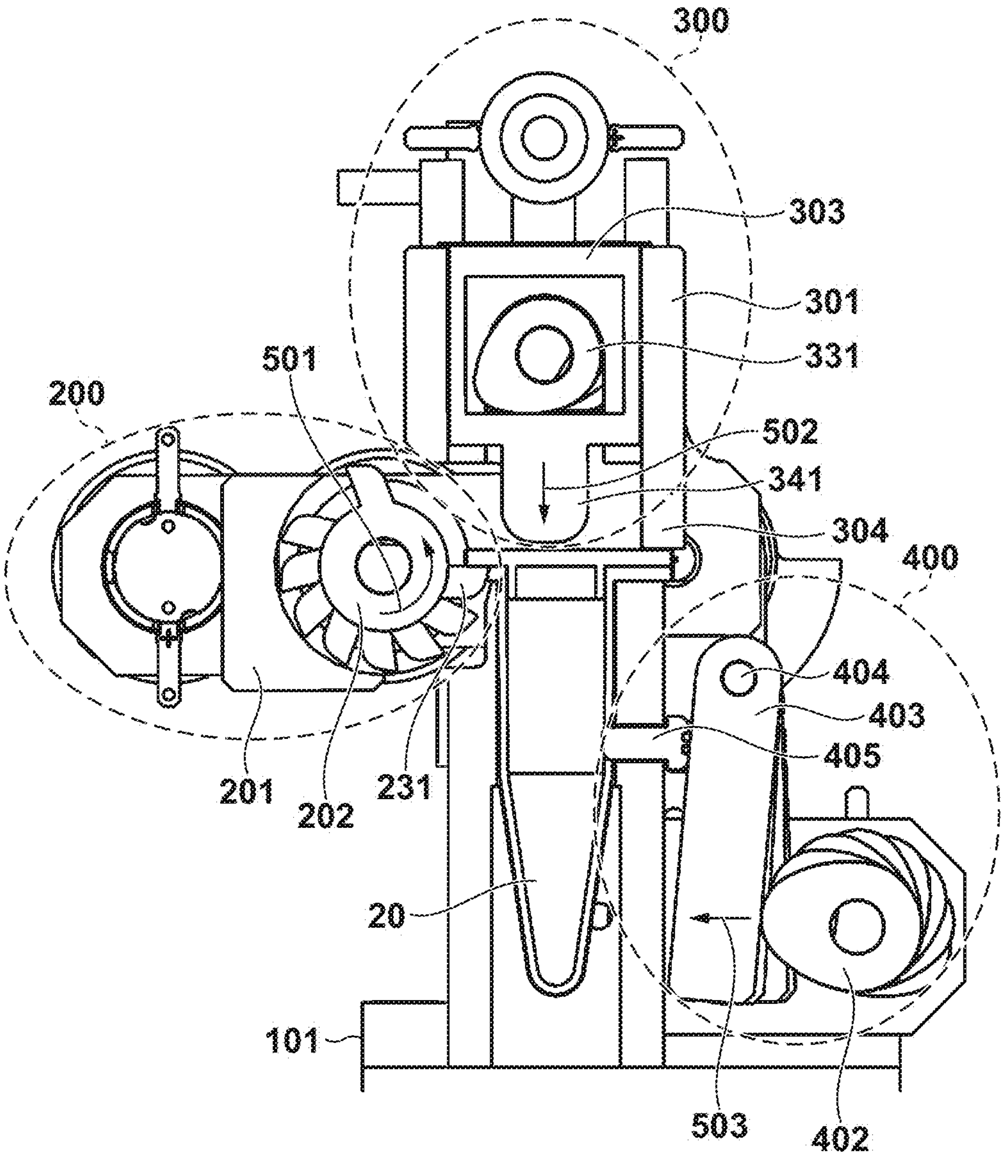
FIG. 5 is a diagram illustrating the arrangements of the uncapping mechanism unit, the holding mechanism unit, and the capping mechanism unit.

FIG. 5 is a schematic diagram showing a positional relationship among the uncapping mechanism unit 200, the capping mechanism unit 300, and the holding mechanism unit 400 attached to the base unit 101 and the micro tubes 20 loaded in the insertion holes 105 of the base unit 101. As a result of rotating the uncapping arm 201, the uncapping operation is performed with the projections 231 in a state where the uncapping mechanism unit 200 is located at the rotation position shown in the figure (hereinafter, an uncapping position). That is to say, while the uncapping roller 202 is rotating in the direction of an arrow 501, edge portions of the caps of the micro tubes 20 temporarily engage with the projections 231 of the uncapping roller 202, thereby causing the caps to be pulled up from the container bodies of the micro tubes 20. Consequently, the tubes 20 are uncapped. Also, as a result of rotating the capping arm 301, the capping operation is performed in a state where the capping mechanism unit 300 is located at the rotation position shown in FIG. 5 (hereinafter, a capping position). That is to say, when the capping cams 331 apply a force to the capping cam followers 303 toward the direction of an arrow 502 as a result of rotating the capping roller 302, the capping cam followers 303 push down the caps of the micro tubes 20, thereby capping the micro tubes 20.

In the holding mechanism unit 400, when a force has been applied to the holding cam followers 403 toward the direction of an arrow 503 as a result of rotation of the holding roller 401, that is to say, rotation of the holding cams 402, the holding pins 405 press the side surfaces of the micro tubes 20, thereby fastening the micro tubes 20. By controlling rotation of the uncapping roller 202 and the holding roller 401, the micro tubes 20 can be fastened with the holding pins 405 in harmony with the timing of uncapping of the micro tubes 20 with the projections 231. In this way, the micro tubes 20 can be reliably fastened when the uncapping mechanism unit 200 uncaps the micro tubes 20, and the contents of the micro tubes 20 are prevented from splattering, contamination, and so forth.

Figure 6A:
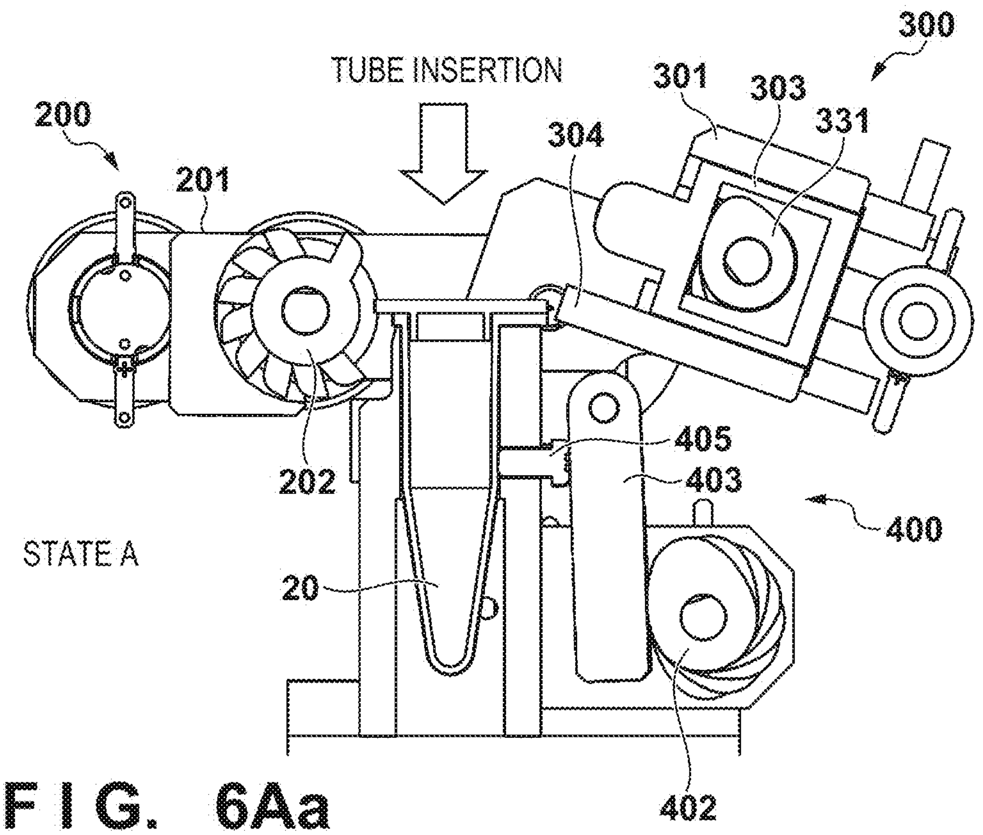
FIGS. 6Aa and 6Ab are diagrams illustrating uncapping/capping operations of the cap opening and closing apparatus according to the embodiment.
Figure 6A:
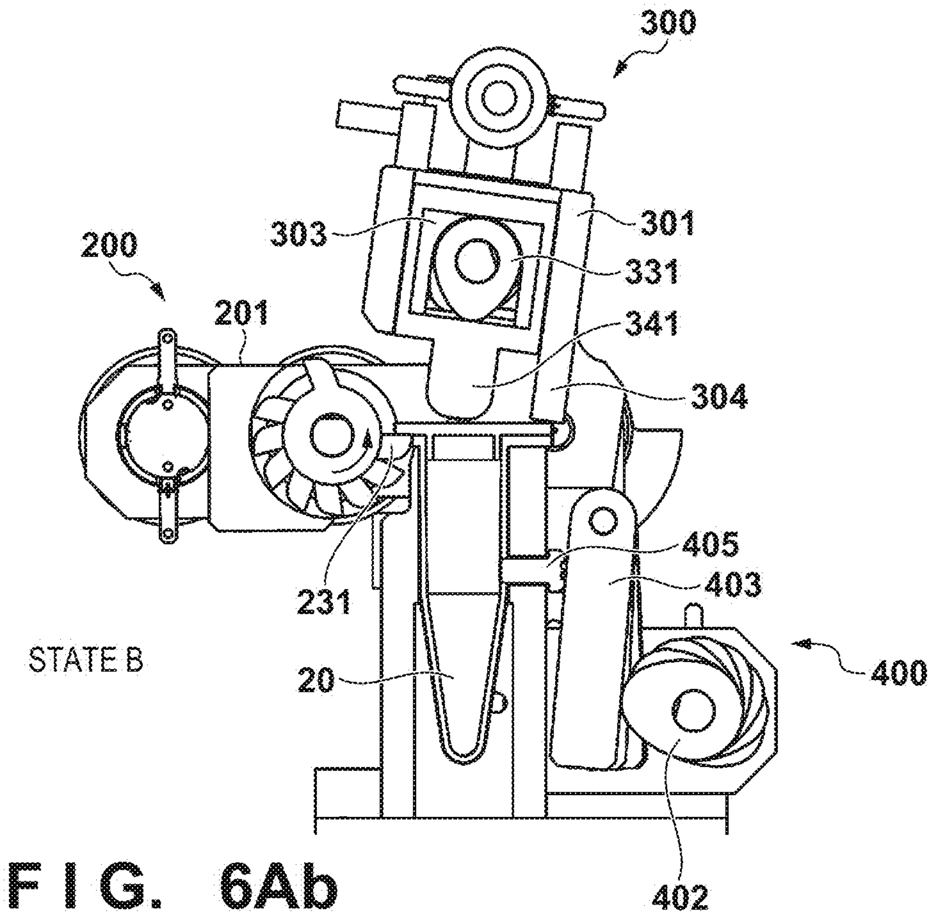
Figure 6B:
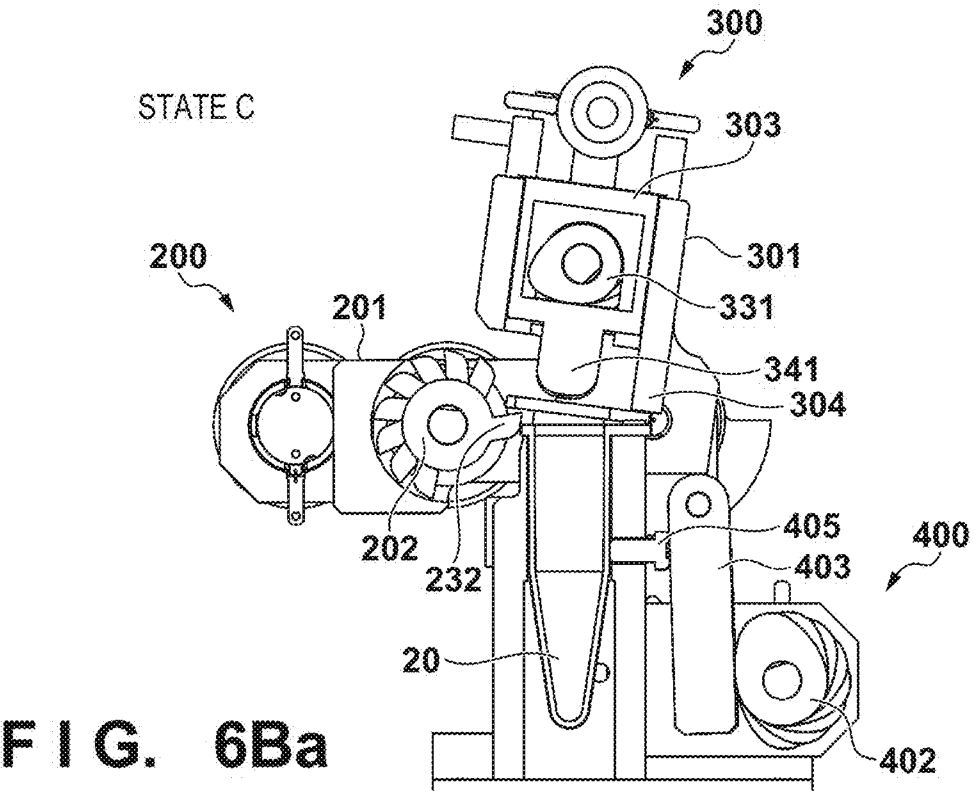
FIGS. 6Ba and 6Bb are diagrams illustrating the uncapping/capping operations of the cap opening and closing apparatus according to the embodiment.
Figure 6B:
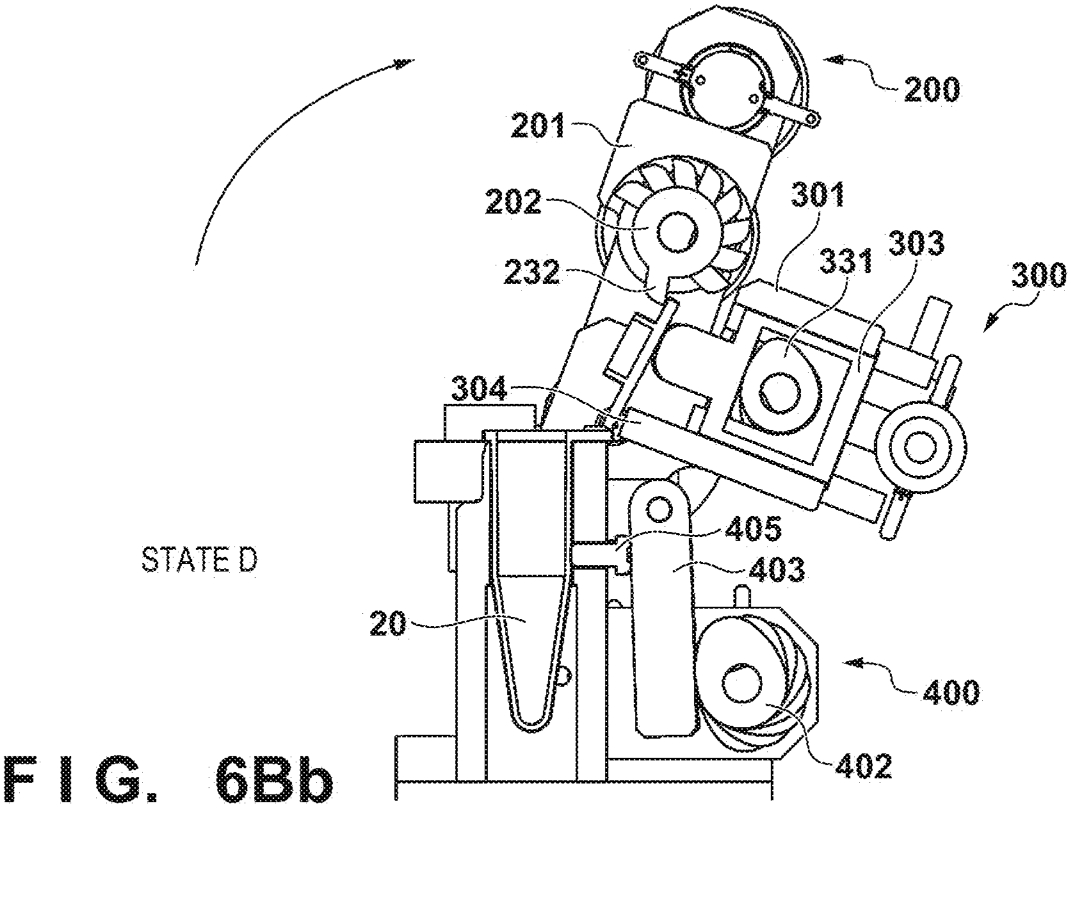
Figure 6C:
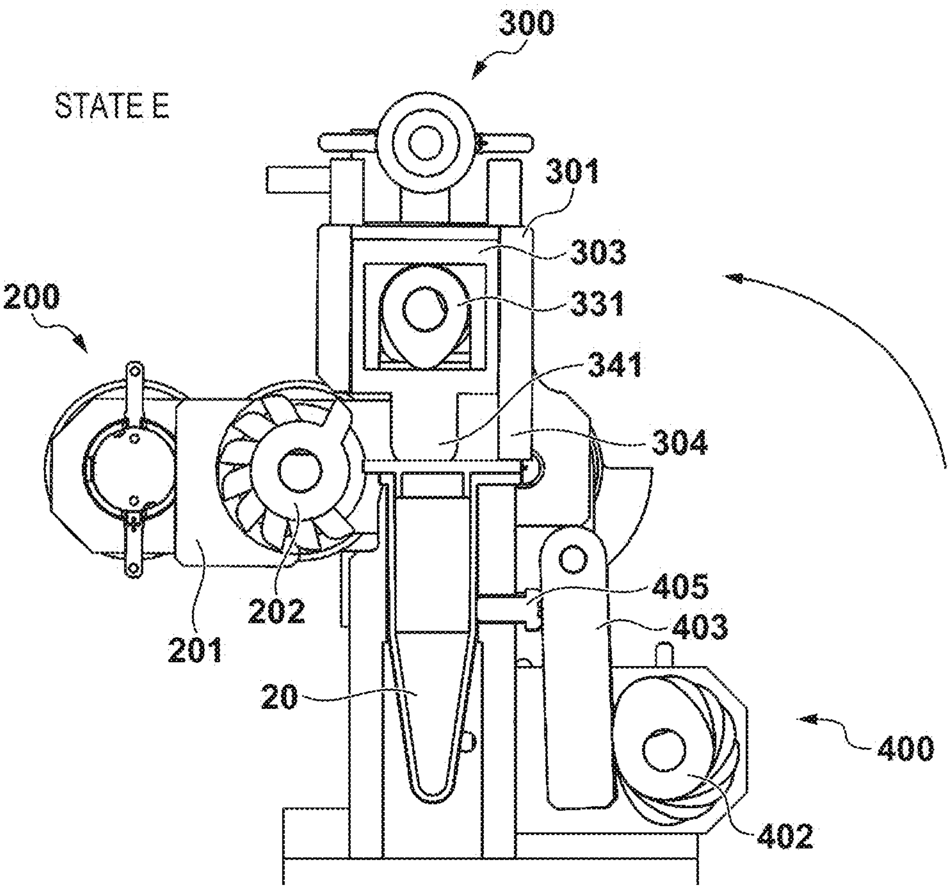
FIG. 6C is a diagram illustrating the uncapping/capping operations of the cap opening and closing apparatus according to the embodiment.

FIGS. 6Aa and 6Ab, FIGS. 6Ba and 6Bb, and FIG. 6C are diagrams illustrating the uncapping operation and the capping operation performed by the cap opening and closing apparatus 100 according to the present embodiment. The operations illustrated in FIGS. 6Aa and 6Ab to FIG. 6C can be realized by, for example, motor control performed by a controller, which is an external apparatus. In view of this, first, a control system that controls the cap opening and closing apparatus 100 according to the embodiment will be described.

Figure 8:
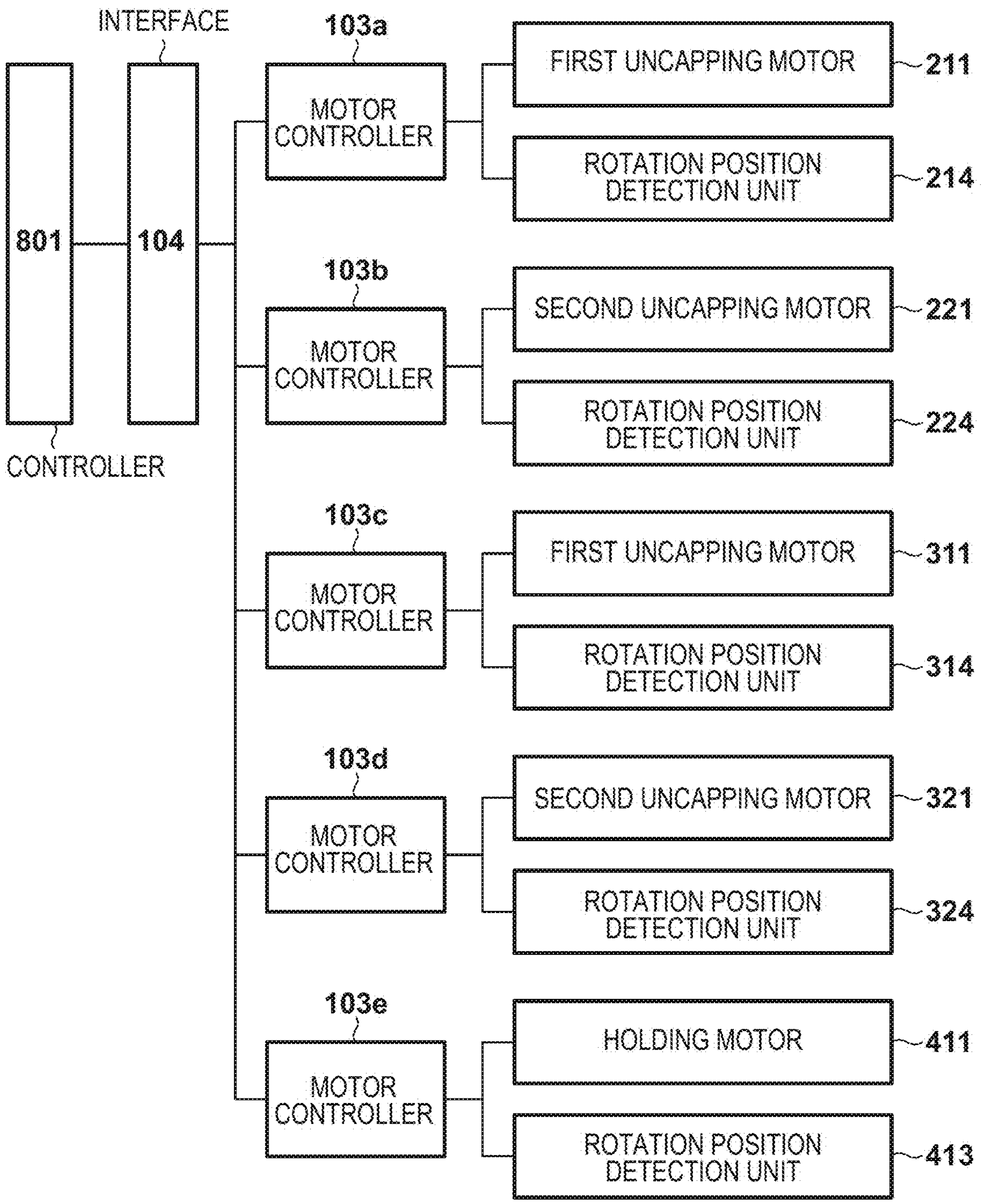
FIG. 8 is a block diagram showing an exemplary configuration of a control system.

FIG. 8 is a block diagram showing the control system according to the present embodiment. A controller 801, which is an external apparatus, is connected to the motor controllers 103 via the interface 104 in a communication-enabled manner. The controller 801 is composed of, for example, a CPU, a ROM, a RAM, and the like; opening and closing control, which will be described below, is realized by the CPU executing a predetermined program stored in the ROM or the like. The controller 801 obtains, for example, a signal from a sensor of the rotation position detection unit 214 via the motor controller 103*a*, and controls rotation of the first uncapping motor 211. The controller 801 issues instructions related to, for example, the activation, suspension, rotation speed, and rotation direction of the first uncapping motor 211 to the motor controller 103*a*. Similarly, the controller 801 obtains signals from the rotation position detection units 224, 314, 324, and 413 via the motor controllers 103*b* to 103*e*, respectively, and controls driving of each motor (221, 311, 321, 411). The opening and closing operations illustrated in FIGS. 6Aa-6Ab to FIG. 6C will be described using a flowchart shown in FIG. 9.

First, in step S901, the controller 801 causes the uncapping arm 201, the uncapping roller 202, the capping arm 301, the capping roller 302, and the holding roller 401 to return to the origins by restoring their rotation positions to the positions of the origins. The arms and the rollers return to their respective origins based on signals of the rotation position detection units 214, 224, 314, 324, and 413 as described above. After the return to the origins has been finished, the controller 801 moves the uncapping arm 201, the uncapping roller 202, the capping arm 301, the capping roller 302, and the holding roller 401 to their respective initial positions (home positions). FIG. 6Aa indicates a state where the uncapping arm 201, the uncapping roller 202, the capping arm 301, the capping roller 302, and the holding roller 401 have moved to their respective initial positions. The state of FIG. 6Aa is a state where the micro tubes 20 can be loaded or unloaded from above the apparatus (hereinafter, a state A). As shown in the state A, in the state of the initial positions, the uncapping mechanism unit 200 and the capping mechanism unit 300 have made rotary movements to an uncapping position and a withdrawal position, respectively. Also, the rotation positions of the uncapping roller 202, the capping roller 302, and the holding roller 401 shown in the state A are respectively regarded as the initial positions thereof. In this state, the projections 231*a* to 231*h* do not engage with the caps of the micro tubes 20, and the holding cams 402*a* to 402*h* do not apply a force to the holding cam followers 403*a* to 403*h*. Furthermore, the uncapping mechanism unit 200 has rotated to the uncapping position, and the capping mechanism unit 300 has rotated to the withdrawal (initial) position, thereby allowing access by a robot hand for loading or unloading the micro tubes 20.

The controller 801 waits for an uncapping instruction in step S902. Upon accepting the uncapping instruction (YES of step S902), the controller 801 causes the capping arm 301 to rotate to the capping position in step S903. Then, in step S904, the controller 801 starts a first uncapping operation. The first uncapping operation will be described using FIG. 6Ab.

FIG. 6Ab indicates a state at the time when the uncapping mechanism unit 200 starts the uncapping operation for the tubes 20 (hereinafter, a state B). In the holding mechanism unit 400, as a result of rotation of the holding roller 401, the holding cams 402 apply a force to the holding cam followers 403, thereby causing the holding pins 405 to push and fasten the micro tubes 20. In the uncapping mechanism unit 200, the uncapping roller 202 rotates, and the projections 231 uncap the micro tubes 20 by engaging with the edge portions of the caps of the micro tubes 20 while the holding pins 405 are fastening the micro tubes 20. At this time, the capping mechanism unit 300 has rotated from the withdrawal position of FIG. 6Aa to the position indicated in FIG. 6Ab (an uncapping aid position) as a result of rotation of the capping arm 301. At this uncapping aid position, the capping cam followers 303 are located diagonally above the micro tubes 20, and the capping cams 331 apply a force to the capping cam followers 303 at the timing of engagement of the projections 231 with the caps (uncapping). In this way, during the uncapping of the micro tubes 20 with the projections 231, the positions of the end portions 341 are restricted so as not to go beyond a predetermined distance from the upper surfaces of the caps. As a result of uncapping the micro tubes with the projections 231 in this state, the caps are prevented from jumping upward during the uncapping, thereby reducing the risks of scattering of droplets and aerosols of samples and reagents inside the micro tubes.

Note that the method of restricting the positions of the end portions 341 so as not to go beyond a predetermined distance from the upper surfaces of the caps during the uncapping of the micro tubes 20 with the projections 231 is not limited to the one described above. For example, the phase of the capping roller 302 may be set between the capping cams 331*h* and 331*a* so as to place all of the capping cam followers (*a-h*) in a predetermined state where a force is applied thereto. In this case, there is no need to rotate the capping roller 302, and control for bringing rotation of the capping roller 302 in synchronization with rotation of the uncapping roller 202 becomes unnecessary.

Until single rotation of the uncapping roller 202 is completed, the above-described uncapping operation is performed using the eight projections 231 (*a-h*) with respect to the eight micro tubes 20 in a sequential order. Hereinafter, this is referred to as a first uncapping operation. That is to say, in the first uncapping operation, as a result of rotation of the uncapping roller 202, the projections 231*a* to 231*h* engage with the caps of the plurality of micro tubes 20 in a sequential order, thereby uncapping the micro tubes 20. Furthermore, during this first uncapping operation, in the holding mechanism unit 400, the holding pins 405 press the micro tubes 20 in a sequential order in harmony with the timing of the uncapping achieved by sequential engagements of the projections 231 with the plurality of micro tubes. In step S904, the controller 801 controls driving of the first capping motor 211, the first uncapping motor 311, and the holding motor 411 so as to realize the above-described first uncapping operation.

Once the uncapping of the eight micro tubes 20 has been completed through the above-described first uncapping operation, processing proceeds to step S905. In step S905, the controller 801 stops the uncapping roller 202 at a rotation position where the projection 232 engages with the caps of the micro tubes 20 (a second capping operation position). FIG. 6Ba indicates a state where, after the uncapping with the projections 231 has been completed, the uncapping roller 202 is stopped at the second uncapping operation position (hereinafter, a state C). The second uncapping operation position is a position where the projection 232 engages with the caps of the micro tubes 20. Also, as the first uncapping operation has been finished, all of the capping cam followers 303 in the capping mechanism unit 300 and all of the holding cam followers 403 in the holding mechanism unit 400 are in a state where no force is applied thereto.

In step S906, while maintaining the rotation position of the stopped uncapping roller 202, the controller 801 causes the uncapping arm 201 and the capping arm 301 to rotate to the withdrawal position. Consequently, each of the uncapping mechanism unit 200 and the capping mechanism unit 300 rotates to the withdrawal position. This state (hereinafter, a state D) is indicated in FIG. 6Bb. At this time, as the projection 232 is in engagement with the caps of all of the micro tubes 20, the caps of the micro tubes 20 can be opened wide as a result of rotation of the uncapping arm 201. As stated earlier, the projection 232 extends in the lengthwise direction of the uncapping roller 202 so as to engage with all of the caps of the plurality of micro tubes 20, and can open all of the caps of the plurality of micro tubes 20 as a result of rotation of the uncapping arm 201. Note, at this time, there is a possibility that the micro tubes 20 move upward. However, as the protruding portions 304 provided on the rear surface of the capping arm 301 remain in the vicinity of the hinge portions of the micro tubes 20 during rotation of the uncapping arm 201, the upward movements of the micro tubes 20 can be suppressed and avoided. Alternatively, the holding function of the holding mechanism unit 400 may be used similarly to the time of uncapping. However, in this case, it is necessary to provide the holding roller 401 with holding cams for simultaneously holding all of the micro tubes 20. The foregoing operation of opening the caps by rotating the uncapping arm 201 in the state where the projection 232 is in engagement with the caps will be referred to as a second uncapping operation.

In the second uncapping operation, the uncapping mechanism unit 200 and the capping mechanism unit 300 rotate to the withdrawal position (the initial position of the capping mechanism unit 300), which leads to a state where the upper parts of the micro tubes 20 are open. Therefore, after the second uncapping operation, it is possible to access the inside of each of the container bodies of the eight micro tubes 20. Note that the external view of the cap opening and closing apparatus 100 shown in FIG. 1A corresponds to the state after the second uncapping operation has been finished, that is to say, the state D.

Next, the capping operation will be described. In step S907, the controller 801 waits for an instruction for starting the capping; when the instruction for starting the capping has been accepted (YES of step S907), processing proceeds to step S908. In step S908, the controller 801 rotates the uncapping arm 201 to the uncapping position (the initial position of the uncapping mechanism unit 200), and rotates the capping arm 301 to the capping position. At this time, the uncapping arm 201 is rotated first, and the uncapping roller 202 is rotated to the initial position while a predetermined angular difference is formed between the uncapping arm 201 and the capping mechanism unit 300. In this way, the uncapping roller 202 can be rotated in a state where there is no inhibition by the capping mechanism unit 300, and the state of engagement between the projection 232 and the caps can be safely cleared. Then, the controller 801 executes the capping operation in step S909. FIG. 6C indicates a state where the capping operation is executed (hereinafter, a state E). As shown in the figure, after the uncapping arm 201 and the capping arm 301 have respectively rotated to the uncapping position and the capping position from the state D, the controller 801 causes the capping roller 302 to rotate. As a result of rotation of the capping roller 302, the capping cams 331*a* to 331*h* apply a force to the capping cam followers 303*a* to 303*h* in a sequential order, thereby capping the eight micro tubes 20 in a sequential order. FIG. 6C indicates a state where a capping cam 331 applies a force to a capping cam follower 303, and an end portion 341 of the capping cam follower 303 pushes an upper surface of a cap, thereby capping a micro tube 20. Once the capping operation has been finished, the controller 801 places the cap opening and closing apparatus 100 back into the state A (FIG. 6Aa) by causing the capping arm 301 to rotate to the withdrawal position (=the initial position) in step S910, and ends processing. Note that it is easy to set the rotation angles and the rotation speeds of the uncapping roller 202, the capping roller 302, and the holding roller 401 during the uncapping and the capping as appropriate in accordance with the phases of the cams and protruding portions.

Note that an application to a system including a combination of the control system of FIG. 8 and a robot is possible. In such a system, a sequence of operations, including a task to dispense equal volumes, can be automatically performed by sharing such operational states as a standby state (an insertable state), completion of insertion, completion of uncapping, completion of dispensing of equal volumes, completion of capping, and completion of removal via communication with a robot controller. Furthermore, the system can also be used as a micro tube capper for manual operations by issuing operational commands via button operations.

As described above, in the first uncapping operation of the states B and C, the operations of removing the caps from the container bodies of the micro tubes 20 are performed in a sequential order, and thus only a small load is required during the uncapping. At this time, as the holding mechanism unit 400 also presses the holding pins 405 in a sequential order in harmony with the uncapping operation for the micro tubes 20, a load related to the holding operation during the uncapping is reduced. Furthermore, in the capping operation of the state E, as the operations of putting the caps to the container bodies of the micro tubes 20 are performed in a sequential order, only a small load is required during the capping.

Note that although the above has described a configuration in which the plurality of micro tubes are uncapped or capped on by one, no limitation is intended by this. The plurality of micro tubes may be divided into a plurality of groups, and may be uncapped or capped on a group-by-group basis. For example, out of the eight micro tubes, two micro tubes may be simultaneously uncapped at a time. Alternatively, for example, the eight micro tubes may be divided into groups that respectively include three micro tubes, two micro tubes, two micro tubes, and one micro tube, and the micro tube(s) belonging to each group may be simultaneously uncapped or capped. Furthermore, two or more micro tubes that belong to a group need not necessary be next to each other; for example, grouping may be conducted so that one group includes the first and the fifth micro tubes, another group includes the second and the sixth micro tubes, and so forth. In addition, the groups may be organized differently between the time of uncapping and the time of capping.

Furthermore, although the holding mechanism unit 400 also holds the plurality of micro tubes one by one, no limitation is intended by this. It is also permissible to use a pressing member that presses and holds the plurality of micro tubes simultaneously. In this case, a mechanism that includes cams/cam followers may not necessarily be used. In addition, in a case where it is sufficient to fasten the micro tubes with the holding mechanism unit 400, the operation of the capping mechanism unit 300 indicated in FIGS. 6Ba and 6Bb (the operation at the uncapping aid position) may be omitted. Alternatively, if there is no problem in uncapping the micro tubes through the operation of the capping mechanism unit 300 at the uncapping aid position, pressing by the holding mechanism unit 400 may be omitted.

Figure 7A:
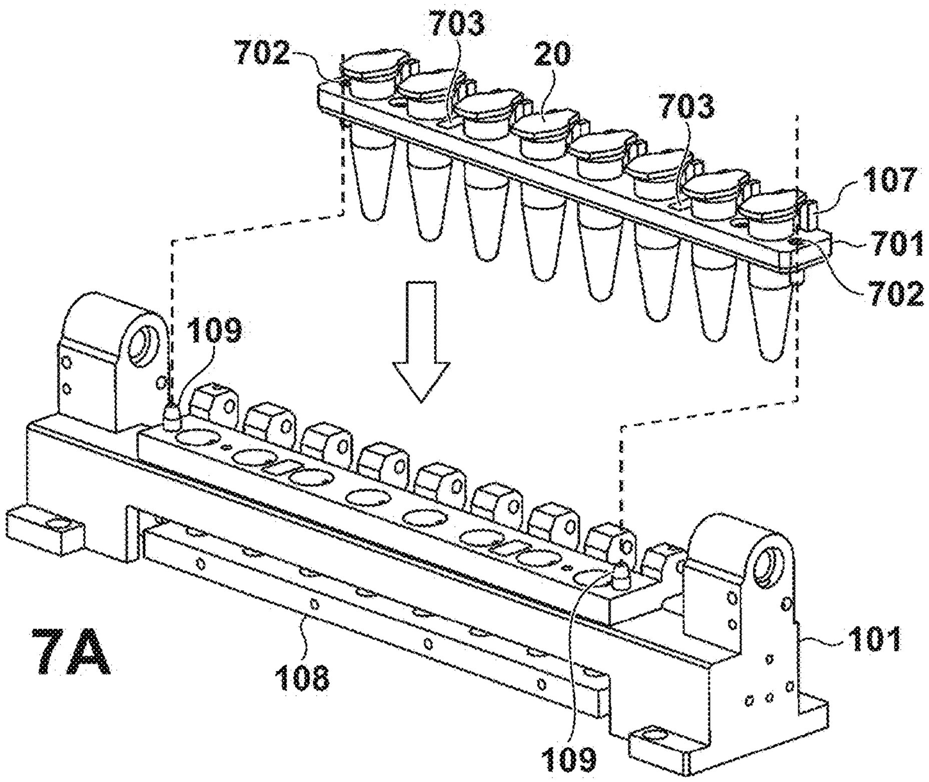
FIGS. 7A to 7C are diagrams illustrating a configuration in which a plurality of micro tubes are installed in a rack.
Figure 7B:
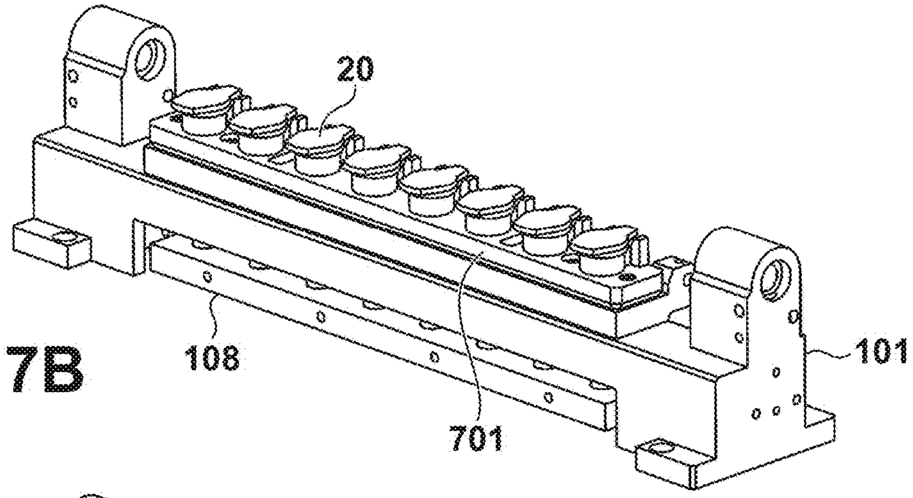
Figure 7C:
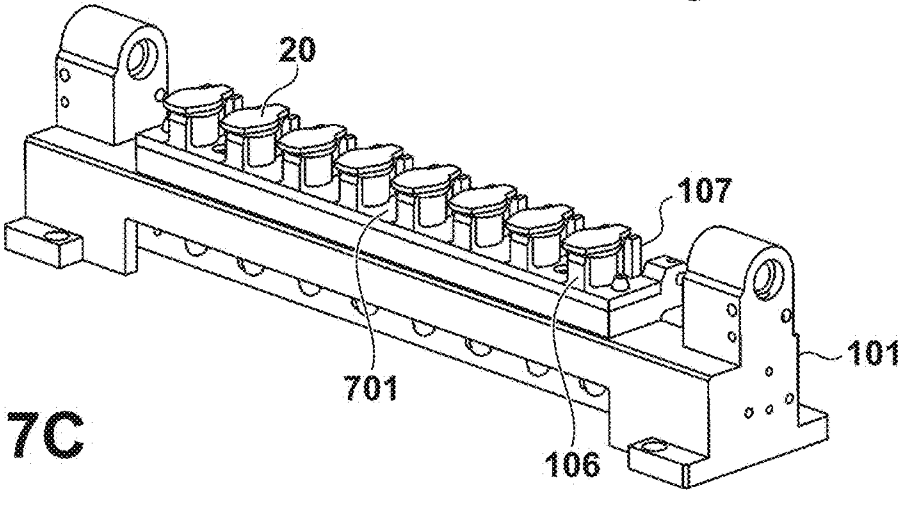

Note that although the cap opening and closing apparatus 100 shown in FIG. 1A and FIG. 1B is configured in such a manner that the eight micro tubes 20 are individually loaded therein, no limitation is intended by this. For example, in order to efficiently load the plurality of micro tubes, a rack equipped with the plurality of micro tubes may be used. FIGS. 7A to 7C are diagrams illustrating a configuration in which the plurality of micro tubes are installed in a rack.

According to FIG. 7A, a rack 701 includes a plurality of (eight in the present example) insertion holes that are aligned in a row to allow the micro tubes 20 to be inserted therein, and rear supports 107 for holding the hinge portions of the inserted micro tubes 20. The insertion holes in the rack 701 are similar to the insertion holes 105 in the base unit 101 (FIG. 1A).

The base unit 101 includes a mount that allows the rack 701 to be mounted so that the plurality of micro tubes held in the rack 701 are uncapped/capped by the uncapping mechanism unit 200, the capping mechanism unit 300, and the holding mechanism unit 400. The mount is provided with guide pins 109, and positioning of the rack 701 to be placed in the base unit 101 is done by fitting guide holes 702 in the rack 701 around the guide pins 109 provided in the base unit 101. Note that the rack 701 is provided with handling holes 703 that are intended for handling by a robot, and the rack 701 can be mounted on the base unit 101 using the robot or the like. FIG. 7B indicates a state where the rack 701 loaded with the micro tubes 20 has been mounted on the base unit 101. Note that according to FIG. 7A, the front supports 106 are omitted from the rack 701; this leads to a possibility that the loaded micro tubes 20 become wobbly. In view of this, the base unit 101 is provided with a plate 108 that has holes intended to hold the tips of the container bodies of the micro tubes 20; in this way, the loaded micro tubes 20 are prevented from becoming wobbly. Note that the rack 701 may be provided with the front supports 106. In this case, the plate 108 for suppressing the wobbliness of the micro tubes 20 may be omitted. FIG. 7C indicates a state where the rack 701 provided with the front supports 106 has been mounted on the base unit 101.

By using the above-described rack 701, the plurality of micro tubes 20 can be loaded or unloaded at a time, thereby improving the operational efficiency of the cap opening and closing apparatus 100.

The invention is not limited to the foregoing embodiments, and various variations/changes are possible within the spirit of the invention.

What is claimed is:

1. A cap opening and closing apparatus that opens and closes caps of a plurality of micro tubes, comprising:

a first rotary member that rotates around a first rotation axis;

a plurality of first engaging portions which are mounted on the first rotary member, and which respectively uncap the plurality of micro tubes by temporarily engaging with the caps during rotation of the first rotary member;

a second rotary member that rotates around a second rotation axis different from the first rotation axis; and a plurality of capping units that, during rotation of the second rotary member, respectively cap the plurality of micro tubes by converting a force of the rotation into a force that temporarily pushes upper surfaces of the caps, wherein the plurality of first engaging portions uncap the plurality of micro tubes until single rotation of the first rotary member is completed by respectively engaging with the caps at different rotation positions of the first rotary member, and the plurality of capping units cap the plurality of micro tubes until single rotation of the second rotary member is completed by respectively pressing the upper surfaces of the caps at different rotation positions of the second rotary member.

2. The cap opening and closing apparatus according to claim 1, wherein the plurality of first engaging portions are provided respectively in correspondence with the plurality of micro tubes, or the plurality of capping units are provided respectively in correspondence with the plurality of micro tubes.

3. The cap opening and closing apparatus according to claim 1, further comprising:

an uncapping arm that holds the first rotary member and rotates around a third rotation axis parallel to the first rotation axis; and a second engaging portion that engages with the caps at a predetermined rotation position of the first rotary member after the uncapping with the plurality of first engaging portions has been finished, wherein while the uncapping arm is causing the first rotary member to rotate around the third rotation axis, the second engaging portion maintains a state where the second engaging portion is in engagement with each of the caps of the plurality of micro tubes.

4. The cap opening and closing apparatus according to claim 3, wherein the first rotary member is a columnar member, and the plurality of first engaging portions and the second engaging portion are composed of a plurality of projections mounted on a side surface of the columnar member.

5. The cap opening and closing apparatus according to claim 4, wherein a projection that composes the second engaging portion extends in a direction parallel to the first rotation axis, and has a length that allows the projection to engage with all of the caps of the plurality of micro tubes.

6. The cap opening and closing apparatus according to claim 1, wherein the plurality of capping units further comprise:

a plurality of cams mounted on the second rotary member; and a plurality of cam followers that push the caps via pressing members when a force is applied thereto by the plurality of cams during rotation of the second rotary member.

7. The cap opening and closing apparatus according to claim 6, wherein while the plurality of first engaging portions are respectively uncapping the plurality of micro tubes, the plurality of cams respectively restrict movements of the plurality of cam followers so that positions of the pressing members do not go beyond a predetermined distance from the upper surfaces of the caps.

8. The cap opening and closing apparatus according to claim 1, wherein the second rotary member and the plurality of capping units rotate between a capping position and a withdrawal position around a fourth rotation axis, and the capping position is a position that is intended for the plurality of capping units to cap the plurality of micro tubes, and the withdrawal position is a position where the second rotary member and the plurality of capping units have withdrawn so as to allow for access to insides of container bodies of the plurality of micro tubes.

9. The cap opening and closing apparatus according to claim 8, further comprising:

a capping arm on which the second rotary member and the plurality of capping units are mounted, and which rotates around the fourth rotation axis, wherein the capping arm includes a portion that remains in a vicinity of hinge portions of the caps during rotation around the fourth rotation axis.

10. The cap opening and closing apparatus according to claim 1, further comprising a holding mechanism unit that, during the uncapping with the plurality of first engaging portions, fastens the plurality of micro tubes by pressing the plurality of micro tubes from side surfaces thereof.

11. The cap opening and closing apparatus according to claim 10, wherein the holding mechanism unit comprises:

a third rotary member that rotates around a fifth rotation axis; and a plurality of conversion mechanisms that convert a force of rotation of the third rotary member into a force that presses the side surfaces of the plurality of micro tubes.

12. The cap opening and closing apparatus according to claim 11, wherein the plurality of conversion mechanisms comprise:

a plurality of cams mounted on the third rotary member; and a plurality of cam followers that press the side surfaces of the micro tubes via holding members when a force is applied thereto by the plurality of cams during rotation of the third rotary member.

13. The cap opening and closing apparatus according to claim 11, wherein the plurality of conversion mechanisms operate so as to sequentially hold the plurality of micro tubes that are uncapped by the plurality of first engaging portions in a in a sequential order.

14. The cap opening and closing apparatus according to claim 1, further comprising:

a rack including a plurality of aligned insertion holes that are intended to hold the plurality of micro tubes aligned in a row, the rack being attachable to and removable from the cap opening and closing apparatus; and a mount on which the rack is mounted so that the plurality of micro tubes held in the rack are uncapped by the plurality of first engaging portions.

15. The cap opening and closing apparatus according to claim 14, wherein the rack includes a support for preventing shaking of the plurality of micro tubes inserted in the plurality of insertion holes.

16. The cap opening and closing apparatus according to claim 14, wherein the mount includes a support that supports lower portions of the plurality of micro tubes in a state where the rack has been mounted so as to prevent shaking of the plurality of micro tubes held in the rack.

* * * * *